United States Patent [19]
Langkamp

[11] Patent Number: 5,813,492
[45] Date of Patent: Sep. 29, 1998

[54] HYDRAULIC FEEDBACK CONTROL

[75] Inventor: Bernd Langkamp, Stuttgart, Germany

[73] Assignee: Mercedes-Benz AG, Stuttgart, Germany

[21] Appl. No.: 648,855

[22] Filed: May 16, 1996

[30] Foreign Application Priority Data

May 16, 1995 [DE] Germany .................. 195 17 871.8

[51] Int. Cl.$^6$ .................................................. B62D 5/06
[52] U.S. Cl. ................................................... 180/417
[58] Field of Search ........................... 180/417, 421,
180/422, 423, 132, 141, 142, 143; 91/375 R

[56] References Cited

U.S. PATENT DOCUMENTS

| | | | |
|---|---|---|---|
| 3,882,954 | 5/1975 | Inoue | 180/79.2 |
| 3,927,602 | 12/1975 | Strauff | 91/375 R |
| 3,978,770 | 9/1976 | Strauff | 91/375 R |
| 5,307,895 | 5/1994 | Duffy | 180/143 |

FOREIGN PATENT DOCUMENTS

| | | | |
|---|---|---|---|
| 2 448 677 | 5/1990 | France . | |
| 24 45 808 A1 | 5/1975 | Germany . | |
| 37 39 848 | 6/1988 | Germany . | |
| 42 42 441 C1 | 5/1994 | Germany . | |
| 63-145175 | 6/1988 | Japan . | |
| 6-42529 | 11/1992 | Japan . | |
| 2099769 | 12/1982 | United Kingdom | 180/132 |

*Primary Examiner*—Sherman Basinger
*Attorney, Agent, or Firm*—Evenson, McKeown, Edwards & Lenahan, P.L.L.C.

[57] ABSTRACT

A hydraulic feedback control for hydraulic power steering systems having first and second shaft sections rotatable relative to one another within limits, and whose relative rotation controls a servo valve system. At least one compressor working chamber is provided in the form of a piston working chamber. A piston is arranged in the piston working chamber, and is displaceable therein and separate from the first shaft section. The piston is tensioned by a pressure in a piston working chamber against a spring engaged with the first shaft section. A maximum possible displacement travel of the piston relative to the second shaft section is limited by a stop mounted thereon. The feedback control is designed so that with limited frictional losses, controllable torques can be produced which counteract the relative rotation between the shaft sections.

15 Claims, 2 Drawing Sheets

HYDRAULIC FEEDBACK CONTROL

BACKGROUND AND SUMMARY OF THE INVENTION

The invention relates to a hydraulic feedback control for hydraulic power steering systems, with two shaft sections rotatable relative to one another within limits. The relative movement of the two shaft sections actuates a servo valve system, preferably designed as a rotary valve system for controlling pressure differentials between connections of a hydraulic servo motor as well as between connections of the feedback control. The servo valve system thus changes a resistance that opposes relative rotation between the shaft sections, with the feedback control having at least one compressor working chamber tangential to the shaft axis.

In hydraulic power steering systems it is desirable and basically known to vary the actuating force to be applied to a handle, for example a steering wheel, at least areawise, in correspondence with the forces generated by the servo motor. As a result, in the case of a power steering system of a motor vehicle for example, assurance can be provided that the driver obtains a good idea of the actually effective steering forces and accordingly has a good idea of the respective driving state as well.

The servo valve system in the power steering systems of motor vehicles is often designed as a rotary valve system, with the shaft sections rotatable relative to one another within limits forming firstly the bushing and secondly the rotary valve of the rotary valve system, or respectively connected therewith. Such designs are characterized by limited space requirements.

A feedback control of the type generally described above is known from German patent document DE 42 42 441 C1. This publication relates to a servo control, especially a power steering system for motor vehicles, in which the servo valve is designed as a rotary valve whose parts are connected nonrotatably with two shaft sections rotatable with respect to one another within limits. The shaft sections are driveably connected with one another by a rotating rod that attempts to keep the shaft sections in a central position relative to one another. The feedback control is designed as an additional rotary valve system whose rotary valve parts are likewise permanently connected with the abovementioned shaft sections, so that the same relative rotations occur between the rotary valve parts and the shaft sections. Between the rotary valve parts of the feedback control, compressor working chambers tangential to the shaft axis are formed which can be charged with a pressure that is controllable and depends on the relative positions of the rotary valve parts, in such fashion that a torque is generated that opposes the respective relative rotation of the shaft parts.

German patent document DE-OS 24 45 808 refers to a power steering system with a vibration-damping device which operates between parts of the servo valve.

The goal of the invention is to provide a novel feedback control with good operating behavior.

This goal is achieved according to the invention by virtue of the fact that the compressor working chamber is designed as a piston working chamber on a shaft section. A piston is provided in the piston working chamber, the piston being displaceable therein and separate from the other shaft section. The piston is tensioned by pressure in the compressor working chamber against a spring provided or mounted on the other shaft section, with the maximum possible displacement travel of the piston relative to a shaft section being limited by a stop mounted thereon.

The invention is based on the general idea of generating a torque between the shaft sections directly through the use of a feedback piston displaceable in the circumferential direction of a shaft section, so that no friction-prone transmission elements are required to convert a force into a torque. By virtue of this displaceability of the feedback piston which is limited relative to one shaft section and the spring located between the piston and the other shaft section, the maximum feedback force is necessarily limited in a desirable fashion. Only limited relative rotations can occur between the shaft sections, so that the spring, after taking up the maximum possible relative rotation as well as taking up the maximum possible displacement travel of the piston, cannot be tensioned any further.

Since two pistons with their associated compressor working chambers are arranged symmetrically with respect to an axial plane of one shaft section, a feedback force is generated in one direction or the other as required.

According to one especially preferred embodiment of the invention, provision is made such that the compressor working chamber or chambers are designed with centered lengthwise axes, in the shape of arcs of a circle with respect to the shaft axis of one shaft section, and the piston or pistons are designed to be in the shape of segments of a circle as seen in an axial view of this shaft section.

In this embodiment, the compressor working chambers as well as the corresponding pistons can easily have rectangular cross sections since the walls of the compressor working chambers that guide the pistons can be composed of a plurality of wall sections.

These and other objects, features and advantages of the present invention will become more readily apparent from the following detailed description when taken in conjunction with the accompanying drawings.

DETAILED DESCRIPTION OF THE DRAWINGS

Figure 1:
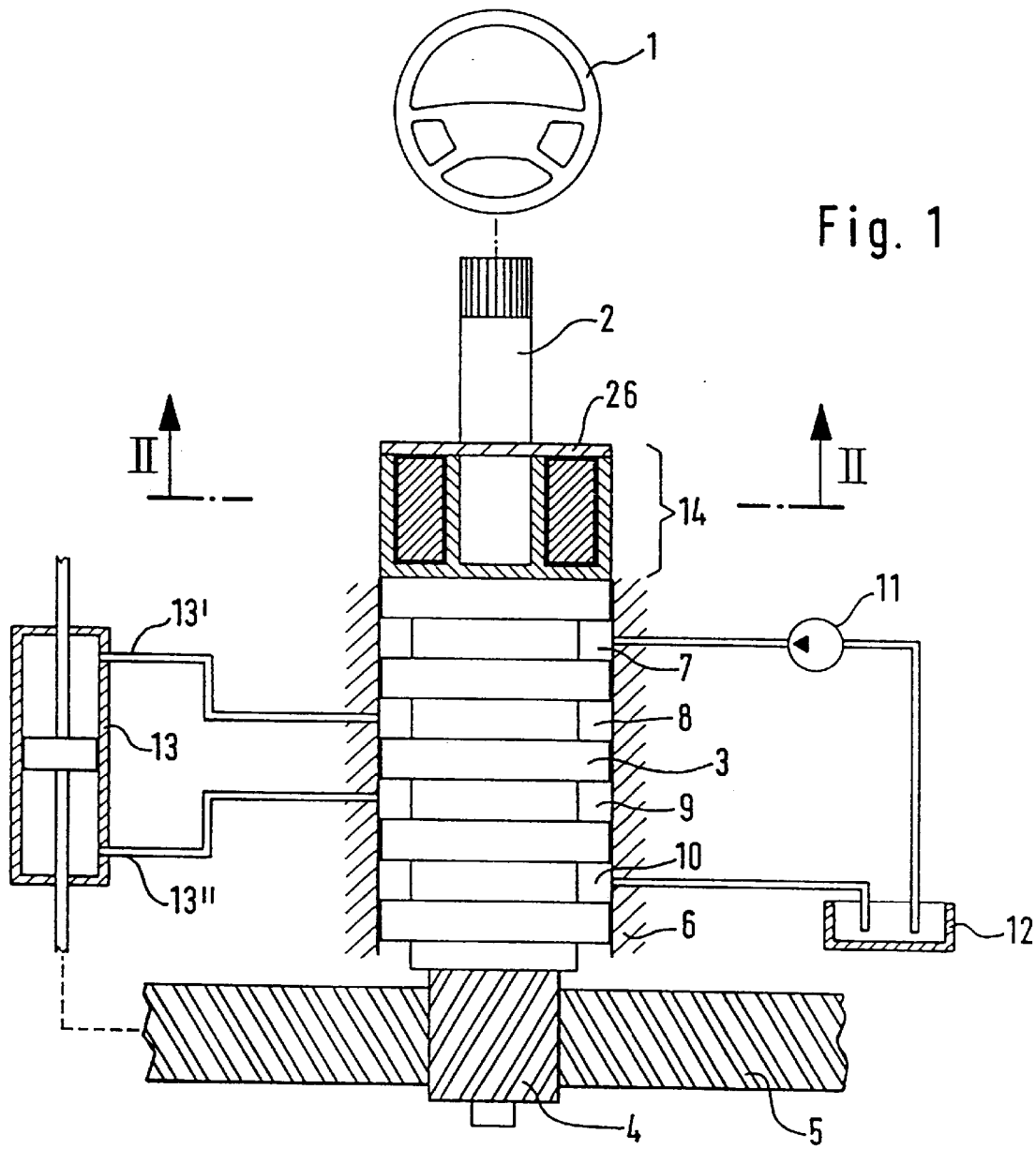
FIG. 1 shows a partially sectioned radial view of a servo valve system with feedback control according to a preferred embodiment of the present invention.

According to FIG. 1, a shaft section 2 connected on the input side to a steering wheel 1 through a steering column or the like, not shown, is driveably coupled with a shaft section 3 on the output side that is connected nonrotatably with a pinion 4 in the example shown. During rotation, the pinion 4 displaces a rack 5 in one direction or the other, so that the steering wheels of a vehicle, not shown, are steered in one direction or the other, depending on the direction of rotation of pinion 4.

Shaft sections 2 and 3 are rotatable within limits relative to one another and jointly form a rotary valve system, with shaft section 2 forming the rotary valve and shaft section 3 forming a rotary valve bushing cooperating therewith. Circumferential grooves or circumferential ribs are provided on shaft section 3. The grooves or ribs, together with a stationary housing 6 that encloses shaft section 3, form various annular chambers 7 to 10. The annular chamber 7 on the input side is connected with a hydraulic pressure source 11, for example a pump, and the annular chamber 10 on the output side is connected with a relatively pressureless hydraulic reservoir 12. The remaining annular chambers 8 and 9 are connected with a servo motor 13 designed for example as a double-acting piston-cylinder assembly, the motor being intended to support the movements of rack 5 and thus being driveably connected with rack 5. Annular chambers 7 to 10 are connected through radial bores, not visible, in shaft section 3 with rotary valve chambers formed radially between shaft sections 2 and 3, delimited from one another by control edges in such fashion that during operation of pressure source 11 a variable pressure differential develops in one direction or the other between connections 13' and 13" of servo motor 13, when shaft sections 2 and 3 are rotated relative to one another from a central position. Such arrangements are basically known.

According to the invention, a feedback control 14 is operable between shaft sections 2 and 3, by which the torque that must be overcome during relative rotation between shaft sections 2 and 3 can be changed depending on the pressure differential between connections 13' and 13" of servo motor 13.

Figure 2:
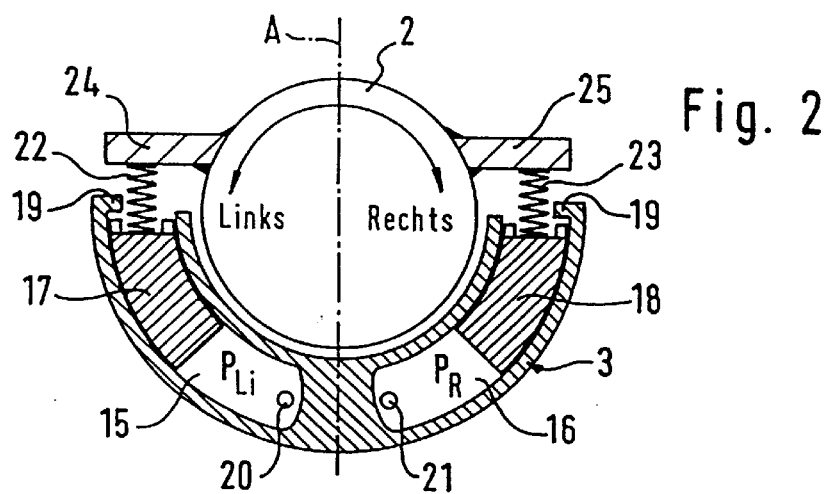
FIG. 2 is an axial sectional view corresponding to section line II–II in FIG. 1.

For this purpose, compressor working chambers in the form of two piston working chambers 15 and 16 are located symmetrically on shaft section 3 with respect to an axial plane A of this shaft section 3. The working chambers 15 and 16 have a rectangular cross section when viewed in a radial direction as shown in FIG. 1 and have a semi-circular cross-section when viewed in an axial direction as shown in FIG. 2. The chambers are centered on the lengthwise axis of shaft section 3.

These piston working chambers 15 and 16, which according to FIG. 2 jointly form an approximate half-circle, are shown open at the top in FIG. 2. Within piston working chambers 15 and 16, pistons 17 and 18 designed as annular segments are mounted displaceably, with cross sections corresponding to piston working chambers 15 and 16. The maximum displacement travel in the direction of the open ends of piston working chambers 15 and 16 is limited by stops 19 provided thereon.

Piston working chambers 15 and 16 can be supplied with hydraulic medium through supply bores 20 and 21. Supply bores 20 and 21 can be switched hydraulically in such fashion that a pressure differential is created between piston working chambers 15 and 16 whose value corresponds to or is analogous to the pressure differential between connections 13' and 13" of servo motor 13. The pressure differential is additionally variable in the latter case as a function of additional parameters, for example the driving speed of a motor vehicle.

Coiled pressure springs 22 and 23 are located on the ends of pistons 17 and 18 opposite supply bores 20 and 21. The ends of the springs opposite the pistons are supported on levers 24 and 25 permanently attached to shaft section 2.

In accordance with the hydraulic pressure differential prevailing between piston working chambers 15 and 16, springs 22 and 23 are tensioned to different degrees by pistons 17 and 18 which are hydraulically tensioned against springs 22 and 23. As a result, a corresponding torque operates between shaft sections 2 and 3 which must be overcome during relative rotation between shaft sections 2 and 3.

Since shaft sections 2 and 3 are rotatable with respect to one another only within limits, in such fashion that levers 24 and 25 are always located at a certain distance in the circumferential direction from the opposite parts of shaft section 3, and since on the other hand pistons 17 and 18 can be displaced only up to stops 19 in each case, the maximum differential between the tensions on coil springs 22 and 23 is limited by design. Accordingly, the torque that can be produced between shaft sections 2 and 3 and opposing relative rotation of these shaft sections 2 and 3 is limited.

Figure 3:
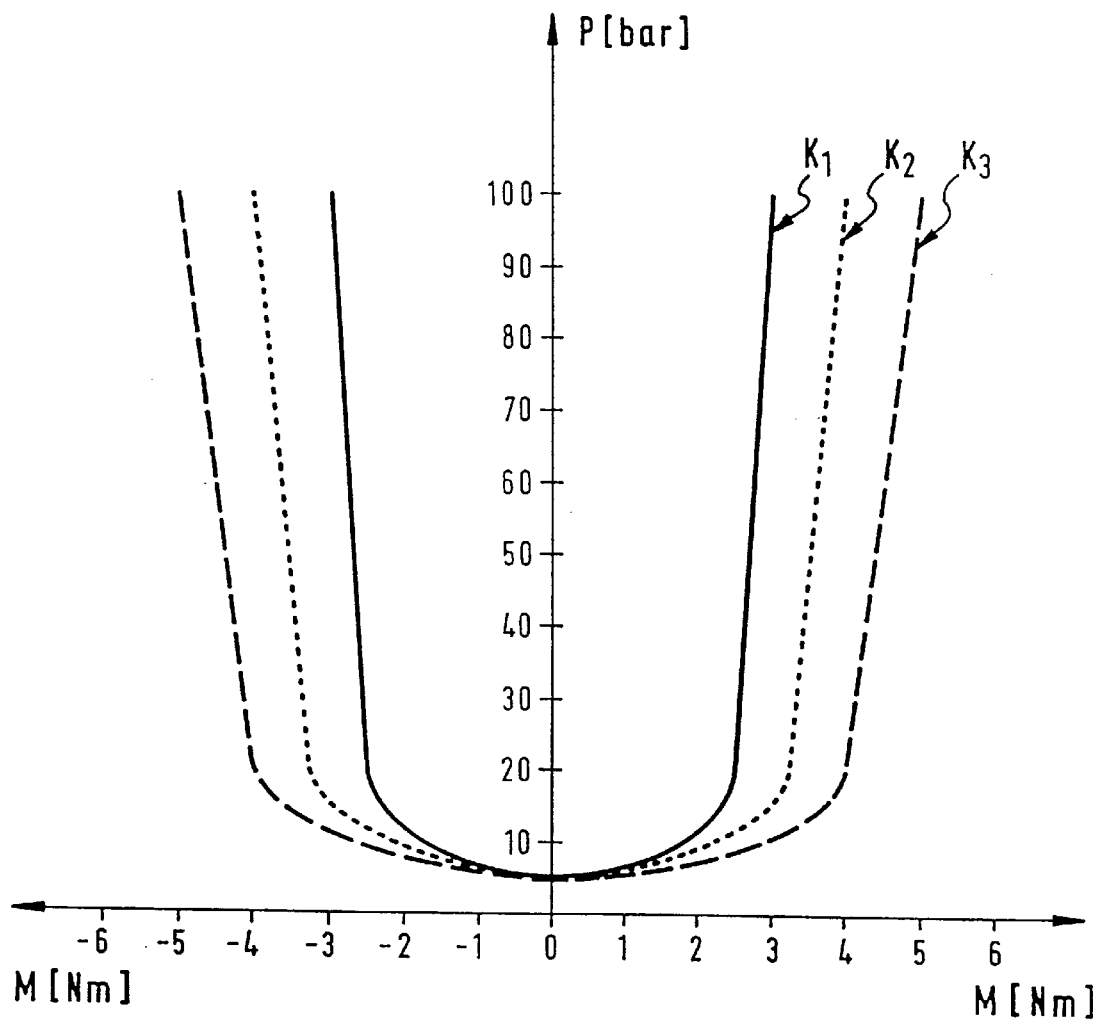
FIG. 3 is a typical curve showing the relationship between the manual force to be applied to a handle and the force generated by a servo motor.

FIG. 3 shows the relationship between the manual force M that must be applied to steering wheel 1 and the pressure differential P that prevails between connections 13' and 13" of servo motor 13. Curve $K_1$ shows the relationships that result when there is no hydraulic pressure differential between piston working chambers 15 and 16. Curves $K_2$ and $K_3$ result when the pressure differential between piston working chambers 15 and 16 is reduced relative to the pressure differential between connections 13' and 13", for example as a function of a parameter to be specified, such as the driving speed of a motor vehicle. Such parameter-dependent control of the pressure differential is basically known, for example with a proportional valve. In this manner, a power steering system can be made slightly more difficult to turn at higher driving speeds. Piston working chambers 15 and 16 can be supplied with hydraulic pressure medium through bores provided or formed in shaft section 3.

To produce piston working chambers 15 and 16, grooves can be provided on one end of shaft section 3 that are open toward the end. These grooves can be shut off by a disk 26 to form piston working chambers 15 and 16, with this disk 26 advantageously being placed in the abovementioned grooves after pistons 17 and 18 are installed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hydraulic feedback control for a hydraulic power steering system having first and second shaft sections that are rotatable relative to one another within limits and whose relative rotation actuates a servo valve system to control a pressure differential between connections of a servo motor or between feedback connections in order to change a resistance that opposes said relative rotation between the shaft sections, said feedback control having at least one compressor working chamber tangential to an axis of rotation of said shaft sections, wherein the compressor working chamber is configured as a piston working chamber and a piston is arranged in the piston working chamber, said piston being displaceable therein and separate from the first shaft section, said piston being tensioned by a pressure in the piston working chamber against a spring engaged with each of the first shaft section and the piston, with a maximum possible displacement travel of the piston relative to the second shaft section being limited by a stop mounted thereon.

2. A hydraulic feedback control according to claim 1, wherein said servo valve system is a rotary valve system.

3. A hydraulic feedback control system according to claim 1, wherein said piston working chamber is formed in said second shaft section.

4. A hydraulic feedback control according to claim 1, having two of said compressor working chambers which have corresponding respective pistons, said compressor working chambers being arranged symmetrically with respect to an axial plane passing through said axis of rotation.

5. A hydraulic feedback control according claim 4, wherein the pressure in the compressor working chamber or a pressure differential between compressor working chambers is controllable as a function of a parameter.

6. A hydraulic feedback control according to claim 1, wherein the at least one compressor working chamber is configured as a semi-circular opening in an axial cross-section and is centered on said axis of rotation, and the piston is configured as an annular segment in an axial cross-section.

7. A hydraulic feedback control according claim 6, wherein the pressure in the compressor working chamber or a pressure differential between compressor working chambers is controllable as a function of a parameter.

8. A hydraulic feedback control according claim 1, wherein the pressure in the compressor working chamber or a pressure differential between compressor working chambers is controllable as a function of a parameter.

9. A hydraulic feedback control for a hydraulic power steering system having first and second shaft sections that are rotatable relative to one another within limits and whose relative rotation actuates a servo valve system to control a pressure differential between connections of a servo motor or between feedback connections in order to change a resistance that opposes said relative rotation between the shaft sections, said feedback control having at least one compressor working chamber tangential to an axis of rotation of said shaft sections, the at least one compressor working chamber being configured as a semi-circular opening in an axial cross-section and being centered on said axis of rotation, the compressor working chamber being configured as a piston working chamber and a piston being arranged in the piston working chamber, said piston being displaceable therein and being separate from the first shaft section, said piston being tensioned by a pressure in the piston working chamber against a spring engaged with the first shaft section, with a maximum possible displacement travel of the piston relative to the second shaft section being limited by a stop mounted thereon, the piston being configured as an annular segment in an axial cross-section.

10. A hydraulic feedback control according claim 9, wherein the pressure in the compressor working chamber or a pressure differential between compressor working chambers is controllable as a function of a parameter.

11. A hydraulic feedback control for a hydraulic power steering system, comprising:

first and second shaft sections that are rotatable relative to one another about an axis of rotation;

first and second pressure working chambers defined in said second shaft section, an axial cross-section of each of said pressure working chambers defining an annular segment;

first and second pistons displaceably arranged in said first and second pressure working chambers, respectively;

a first spring arranged to provide a biasing force between said first piston and said first shaft section; and a second spring arranged to provide a biasing force between said second piston and said first shaft section.

12. A hydraulic feedback control according to claim 11, wherein the first and second pistons are configured as annular segments in an axial cross-section.

13. A hydraulic feedback control according to claim 11, wherein said annular segment is centered on said axis of rotation.

14. A hydraulic feedback control according to claim 11, wherein said first and second pressure working chambers are arranged symmetrically with respect to an axial plane passing through said axis of rotation.

15. A hydraulic feedback control according to claim 11, wherein said first and second pistons are tensioned by pressure in the piston working chambers against said first and second springs.

* * * * *